United States Patent [19]

Owen

[11] 4,003,078

[45] Jan. 11, 1977

[54] SUB CARRIER PHASE SHIFTERS

[75] Inventor: David Peter Owen, Newbury, England

[73] Assignee: Quantel Limited, England

[22] Filed: June 3, 1975

[21] Appl. No.: 583,385

[30] Foreign Application Priority Data

June 6, 1974 United Kingdom ............ 25074/74

[52] U.S. Cl. .................................. 358/22; 307/262; 328/155; 358/149
[51] Int. Cl.² .................. H04N 9/539; H04N 5/22; H03K 1/12; H03K 5/13
[58] Field of Search .................. 358/19, 13, 16, 28, 358/35, 8; 178/69.5 CB, 69.5 DC, DIG. 3, 69.5 TV; 360/39, 42, 26; 328/207, 155; 307/262, 273, 295, 293

[56] References Cited

UNITED STATES PATENTS

| | | | |
|---|---|---|---|
| 3,311,702 | 3/1967 | Legler | 178/69.5 DC |
| 3,449,510 | 6/1969 | Steinkopf | 328/307 |
| 3,493,680 | 2/1970 | Brown | 178/69.5 DC |
| 3,571,732 | 3/1971 | Richardson | 307/273 |
| 3,657,732 | 4/1972 | Krause | 307/295 |
| 3,863,264 | 1/1975 | Nelson et al. | 358/11 |
| 3,867,010 | 2/1975 | Rzeszewski | 358/28 |

OTHER PUBLICATIONS

"Delay Multivibrator;" Epsco Components; Bull. TDC-113; Nov. 1, 1958, pp. 1, 2.

Primary Examiner—John C. Martin
Attorney, Agent, or Firm—Dowell & Dowell

[57] ABSTRACT

A sub carrier phase shifting circuit for use in digital television equipment comprising at least two monostable multivibrators connected in cascade. The sub carrier signal is applied to the first multivibrator. Adjusting means are connected to the control inputs of each multivibrator for adjusting the monostable period of the multivibrators. On receipt of an edge of a sub carrier wave the first multivibrator is driven from a first state to a second state whereby the first multivibrator effects a change of state at its output. The first multivibrator resets to its first state after the monostable period determined by the adjusting means to give an output delayed in relation to the edge of the sub carrier wave. The delayed output causes the second multivibrator to be driven from one state to its other whereby the second multivibrator effects a change of state at its output. The second multivibrator resets to its first state after the monostable period of the second multivibrator has elapsed, to give an output further delayed in relation to the edge of the sub carrier wave.

6 Claims, 4 Drawing Figures

SUB CARRIER PHASE SHIFTERS

BACKGROUND TO THE INVENTION

This invention relates to sub carrier phase shifters for television equipment.

Television signals within a studio complex are normally handled as a signal known as the composite video waveform.

The waveform may be divided into three time regions:

1. The sync pulse which locks the scanning circuits of a television receiver.
2. The colour burst which locks a sub carrier regenerator oscillator to decode the chrominance information.
3. The active picture time during which picture information both chrominance and luminance are transmitted.

Artistic and creative requirements demand that two or more composite signals may be mixed and processed with no apparent time disturbance on the summed output.

During the mixing of two signals the sync pulse and colour burst portions of the video waveform must remain undisturbed which means that the frequency and timing of the two mixed sync pulses must be identical, and that the frequency and phase of the two mixed colour burst must also be equal. If this were not so, a picture shift and chrominance disturbance would be observed during the mixing process. Identical frequencies of the synchronizing components is usually ensured by feeding all picture origination equipment with synchronizing pulses and reference sub carrier generated from a central synchronizing pulse generator. However, to ensure that the colour bursts are of the same phase at the mixing point regardless of system delays, each piece of picture origination equipment must have incorporated a variable phase shifter which can introduce a phase shift in the reference sub carrier path of preferably but not necessarily a 0°–360° shift. It is such a phase shifter that is the subject of the present invention.

Some existing solutions to this requirement are listed below.

a. Cascaded tapped lumped-constant delay lines which may be connected to give the required delay or phase shift. This system does not lend itself to rapid adjustment.

b. A rotating pick up coil which moves within a magnetic field alternating at sub carrier rate. This method provides an easily adjustable control but is an expensive item to produce.

c. Use of high capacitance diodes in which the capacitance varies with voltage (e.g. varicap diodes) within band pass filter networks to vary the delay of such networks. This method is often used since the adjustment can be made by varying a dc level but it can only reasonably provide about 180° of phase adjustment. Sub carrier stability requirements also demand that the varactor diodes be enclosed in a temperature controlled environment.

SUMMARY OF THE INVENTION

According to the invention there is provided a sub carrier phase shifting circuit for use in digital television equipment comprising a monostable multivibrator for receiving the sub carrier signal, adjusting means for adjusting the monostable period of said multivibrator, wherein on receipt of an edge of a sub carrier wave the multivibrator is driven from a first state to a second state whereby the multivibrator effects a change of state at its output, said multivibrator re-setting to its first state after said monostable period determined by said adjusting means to give an output delayed in relation to said edge of the sub carrier wave.

Further according to the invention there is provided a sub carrier phase shifting circuit for use in digital television equipment, comprising at least two monostable multivibrators connected in cascade, the sub carrier signal being applied to the first multivibrator, adjusting means connected to the control inputs of each multivibrator for adjusting the monostable period of said multivibrators, wherein on receipt of an edge of a sub carrier wave the first multivibrator is driven from a first state to a second state whereby the first multivibrator effects a change of state at its output, said multivibrator resetting to its first state after said monostable period determined by said adjusting means to give an output delayed in relation to said edge of the sub carrier wave, said delayed output causing the second multivibrator to be driven from one state to its other whereby the second multivibrator resetting to its first state after the monostable period of said second multivibrator has elapsed, to give an output further delayed in relation to said edge of the sub carrier wave.

BRIEF DESCRIPTION OF THE DRAWINGS

The invention will now be described by way of example with reference to the accompanying drawings in which.

Figure 1:
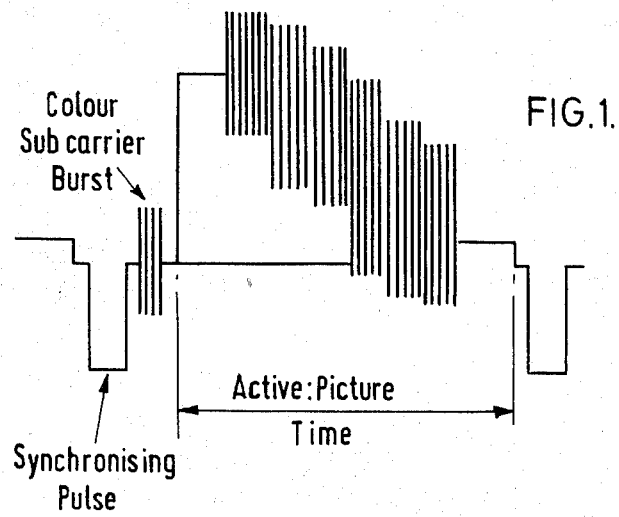
FIG. 1 shows a composite video waveform.

The composite video waveform of a colour picture is shown in FIG. 1 which includes sync pulse, colour burst and active picture information as described above.

Figure 2:
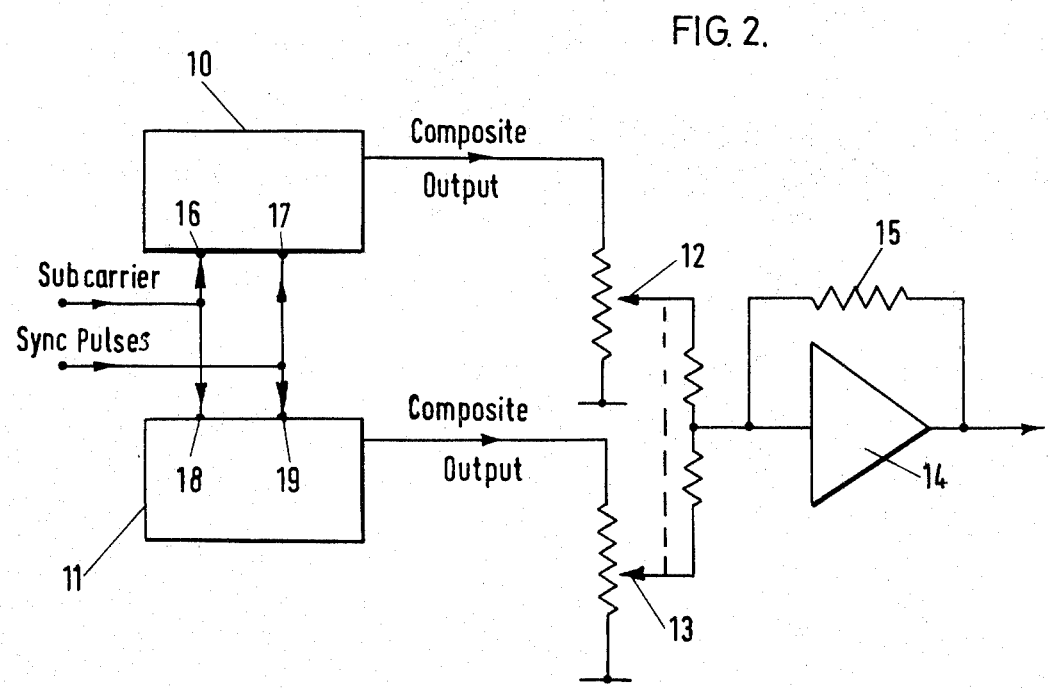
FIG. 2 shows a simple mixing arrangement for the colour sources.

A simple mixing arrangement is shown in FIG. 2 in which the two colour picture sources 10, 11 have their outputs connected via dividers 12, 13 to a summing amplifier 14 having a feedback resistor 15. The two pieces of equipment 10, 11 which may be a camera and a video tape recorder respectively receive at inputs 16, 18 and 17, 19 a sub carrier frequency signal and sync pulses from a central sync pulse generator for processing as above.

DESCRIPTION OF PREFERRED EMBODIMENTS

Figure 3:
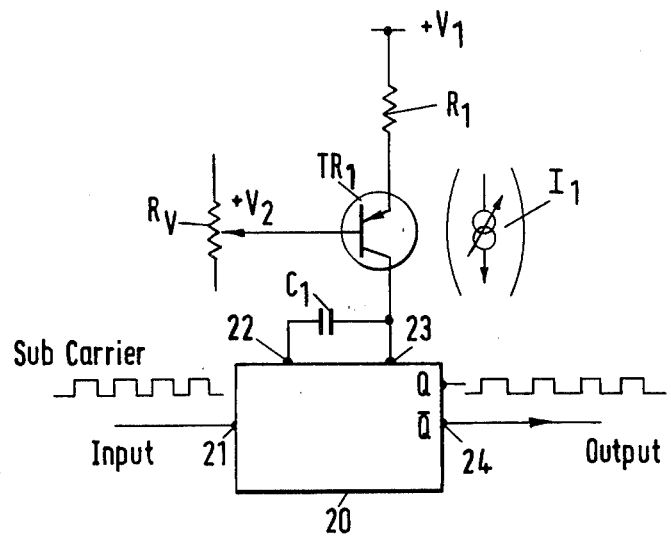
FIG. 3 shows a phase shifter circuit incorporating a multivibrator for use in the present invention.

The circuit shown in FIG. 3 which could be inserted for example in the sub carrier input line before input 16 of source 10 of FIG. 2 to provide phase adjustment thereof, comprises a monostable multivibrator 2 (preferably of the type TTL 74121 manufactured by Texas Instruments) having an input 21 for receiving the sub carrier signal. A phase control circuit is connected to said multivibrator 20, including a capacitor $C_1$ connected across the timing pins 22 and 23 labelled respectively on the multivibrator 'C External' and 'R External/C External' and a transistor $TR_1$ having its base connected to the slider of a variable resistor $R_V$ and its emitter connected to a positive voltage rail $(+V_1)$ via a resistor $R_1$. The collector is connected to the control input 23 in common with the capacitor $C_1$.

A phase variable sub carrier frequency is obtainable at the output 24 (Q). When the monostable times out, a positive going edge is produced on the output 24 (Q). In the phase shifter circuit as shown in FIG. 3, $I_1 = V_1 - V_2 - V_{BE}/R_1$ and the monostable period T $(C_1/I_1)$. By adjusting the monostable period by means of variable resistor $R_V$, it is therefore possible to introduce a phase delay between the positive going edges at the input 21 and output 24. The monostable period is proportional to the capacitance C1 and inversely proportional to the collector current of transistor TR1. The duty cycle may therefore be varied by altering the collector current which is controlled by the base voltage and emitter resistor R1 by manual control of the variable resistor $R_V$. The resistor $R_V$ is adjusted until phase synchronisation is achieved as indicated by a vectorscope.

Since it is not possible to vary the duty cycle of a monostable continuously from 0–100%, it can be seen that only a limited phase adjustment can be provided by one monostable. It is therefore preferable to cascade at least two monostables to provide the full 0°–360° phase adjustment, i.e. each monostable varying its duty cycle by 50% or 180°. The circuit is implemented using an integrated circuit monostable (such as TTL 74121 referred to above) which provides extremely low jitter characteristics and has built-in temperature compensation. The monostables also require a relatively long time (about 40 nanoseconds) to recover after timing out. This means that further restrictions are placed on the variation of duty cycle since the NTSC sub carrier period is only 279 nanoseconds and the PAL sub carrier period is only 225 nanoseconds. This means that 3 monostables actions must be used each providing a variation of 33⅓% of the sub carrier period where a full 360° phase shift is required.

Figure 4:
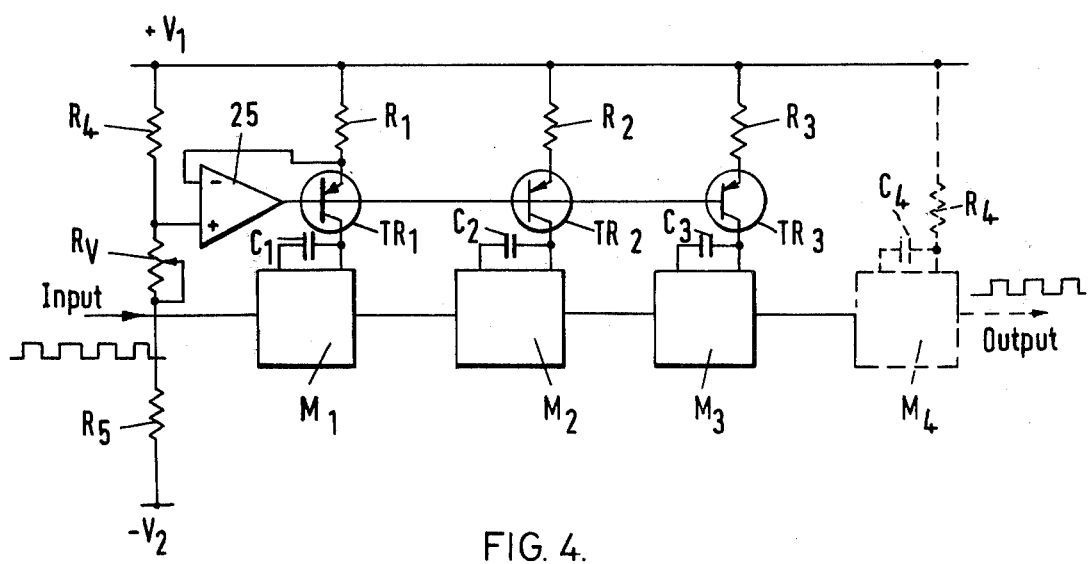
FIG. 4 shows a series connection of multivibrators for achieving a full 0°–360° phase adjustment.

The complete circuit is shown in FIG. 4, which shows three monostable multivibrators $M_1$, $M_2$, $M_3$ connected in series with identical external components capacitors $C_1$, $C_2$, $C_3$. The bases of transistors TR1, TR2 and TR3 are all connected to the output of operational amplifier 25 which is connected as a voltage follower and in this configuration ensures that the current flowing through the emitter resistor $R_1$, ($R_2$ or $R_3$) is dependent only on the power supply voltage +V1, and the voltage on the non-inverting input of the operational amplifier. It is assumed that the temperature co-efficients of the base emitter junction voltage drop of TR1, TR2 and TR3 are reasonably matched. Adjustments of the monostable delays is provided by the variable resistor RV which is inserted in the potentiometer chain of RV, R4 and R5. In this configuration, a linear relationship between the rotational adjustment of variable resistor and the resultant delay is obtained. Since the current into the non-inverting input of the operational amplifier is very small, the variable resistor and its associated components need not necessarily lie in the vicinity of the active circuits.

If a square wave sub carrier output is required, then the circuit may be followed by a further monostable $M_4$ having a period equal to half the sub carrier period which restores the output waveform to a 50–50 mark-space ratio. As shown in chain lines, the monostable is provided with an external circuit connected to the timing pins comprising resistor R4 and capacitor C4 so selected as to provide the multivibrator with a period equal to half the sub carrier period.

The phase shifter circuit may also be used in a digital time base corrector and in this application only the phase adjustment of positive going edges is required. In this application, the circuit provides an attractive solution to the phase shifting problem since most of the signal processing is carried out in a digital fashion. However, the circuit could be readily adapted for use in other colour television picture source equipment such as video tape recorders, encoders, colour bar generators and any special purpose video waveform generator whose output phase is to be adjusted for coincidence with other signal sources.

With the phase shifter of the present invention, design requirements achieved are as follows:
1. 0°–360° adjustment of either PAL or NTSC reference sub carrier using three monostable multivibrators.
2. Operable by a varying dc level.
3. No more than 1 nanosecond peak to peak jitter.
4. The phase shift does not vary with ambient temperature.
5. The circuit is simple to produce.
6. The input and output are TTL compatible.

I claim:

1. In digital television equipment employing sub carrier waves, a smoothly variable circuit for shifting the phase of a sub carrier wave to achieve any shift within the shift capability of the circuit, comprising:

a variable source of phase-shift control voltage;

a monostable multivibrator having an input trigger terminal connected to receive said sub carrier wave, and having an output terminal, and having resistance and capacitance time constant elements for determining the duration of the astable state when the multivibrator is triggered from its stable state by an edge of said wave; and said resistance time constant element comprising electronic amplifier means having a resistive path therethrough comprising said resistance element of the time constant, and having a control electrode coupled to said variable source, whereby said control voltage controls the time constant of said multivibrator.

2. In digital television equipment employing sub carrier waves, a smoothly variable circuit for shifting the phase of a sub carrier wave to achieve any shift within the shift capability of the circuit, comprising:

a variable source of phase-shift control voltage;

at least two cascade connected monostable multivibrators each having an input trigger terminal and an output terminal, and each having resistance and capacitance time constant elements for determining the duration of the astable state when the multivibrator is triggered from its stable state, the trigger terminal of the first multivibrator being connected to receive and be triggered by an edge of said sub carrier wave, and the output terminal of the first multivibrator being connected to the input trigger terminal of the second multivibrator; and said resistance time constant element in each multivibrator respectively comprising electronic amplifier means having a resistive path therethrough comprising said resistance element of the associated time constant, and each amplifier means having a control electrode, and all said control electrodes being coupled to said variable source, whereby said control voltage controls the time constants of said multivibrators.

3. The circuit as set forth in claim 2, wherein the input trigger terminal of each multivibrator which is connected in cascade to an output terminal of another multivibrator is connected to such output terminal with a wave polarity operative to trigger the multivibrator as the output of said another multivibrator returns to stable state from its astable state, whereby the time constant delays introduced by the cascaded multivibrators are cumulative.

4. The circuit as set forth in claim 3, wherein there are three cascade-connected multivibrators and the input trigger terminal of the third multivibrator is connected to the output terminal of the second multivibrator.

5. The circuit as set forth in claim 2, wherein said variable source comprises a potentiometer connected across a direct current source and having a variable element connected to said control electrodes.

6. The circuit as set forth in claim 2, wherein the circuit further includes a monostable oscillator connected to be driven by the output terminal of the last of the cascade connected multivibrators to deliver a square wave output, and the monostable oscillator having time constant means adjusted to provide an astable period of duration equal to one half the period of the sub carrier.

* * * * *